United States Patent [19]

Yamabe

[11] Patent Number: 4,816,099

[45] Date of Patent: Mar. 28, 1989

[54] METHOD FOR THE PRODUCTION OF A COMPOSITE PIPE AND AN APPARATUS FOR THE SAME

[75] Inventor: Yasuo Yamabe, Saitama, Japan

[73] Assignee: Sekisui Kagaku Kogyo Kabushiki Kaisha, Osaka, Japan

[21] Appl. No.: 18,555

[22] Filed: Feb. 25, 1987

[30] Foreign Application Priority Data

Feb. 26, 1986 [JP] Japan .................................. 61-40760

[51] Int. Cl.[4] .............................................. B29C 47/06
[52] U.S. Cl. .................................... 156/73.1; 156/203; 156/218; 156/244.11; 156/244.12; 156/244.13; 156/244.17; 156/244.23; 156/272.2; 156/379.6; 156/380.1; 156/466; 156/500; 427/239
[58] Field of Search ............... 156/203, 218, 244.11, 156/244.12, 244.13, 244.22, 244.23, 466, 500, 73.1, 272.2, 379.6, 380.1, 244.17; 427/234, 239; 118/317, 408, DIG. 10

[56] References Cited

U.S. PATENT DOCUMENTS

| | | | |
|---|---|---|---|
| 2,912,043 | 11/1959 | Bangholtz et al. | 156/203 |
| 3,376,181 | 4/1968 | Larson et al. | 156/466 |
| 4,370,186 | 1/1983 | Blandin et al. | 156/218 |
| 4,373,982 | 2/1983 | Kreager et al. | 156/203 |

FOREIGN PATENT DOCUMENTS

| | | | |
|---|---|---|---|
| 0002356 | 1/1985 | Japan | 427/239 |
| 1215042 | 9/1986 | Japan | 156/244.13 |

*Primary Examiner*—Caleb Weston
*Attorney, Agent, or Firm*—Armstrong, Nikaido Marmelstein & Kubovcik

[57] ABSTRACT

A method for the production of a composite pipe with at least the inner surface thereof covered with a plastic layer, comprising: forming a coiled metal sheet into a cylinder, during the conveyance of the metal sheet, by a cylindrical inner mold and at least one of a plurality of outer molds lined up in the direction of conveyance of the metal sheet, said outer mold having a housing composed of two separatable parts and being fitted around said inner mold with a fixed space; joining the side edges in the circumferential direction of said cylinder together; and extruding molten resin into a cylindrical shape over the inner surface of the cylinder from the inner mold, resulting in a composite pipe the inner surface of which is covered with a plastic layer.

15 Claims, 7 Drawing Sheets

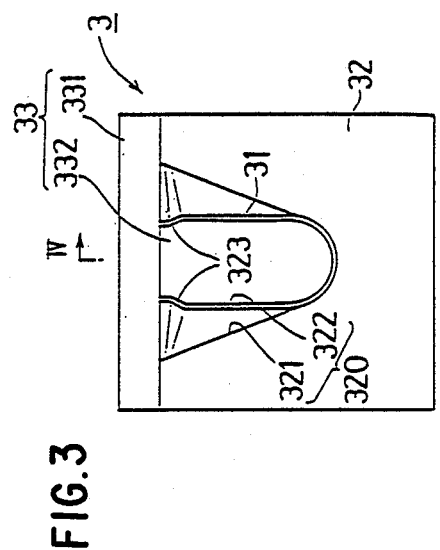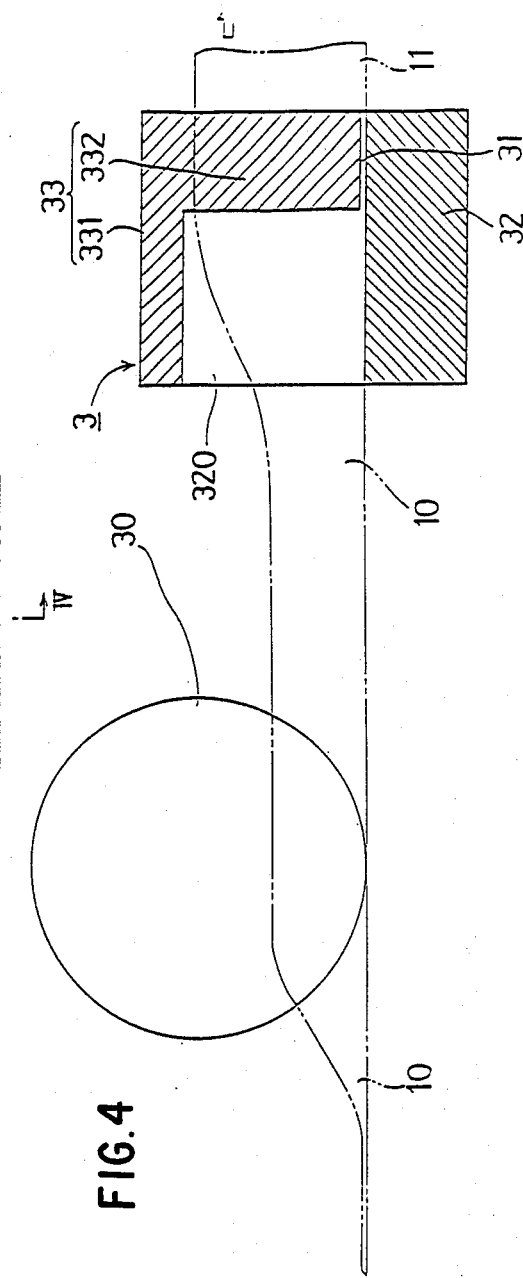
FIG.3
FIG.4

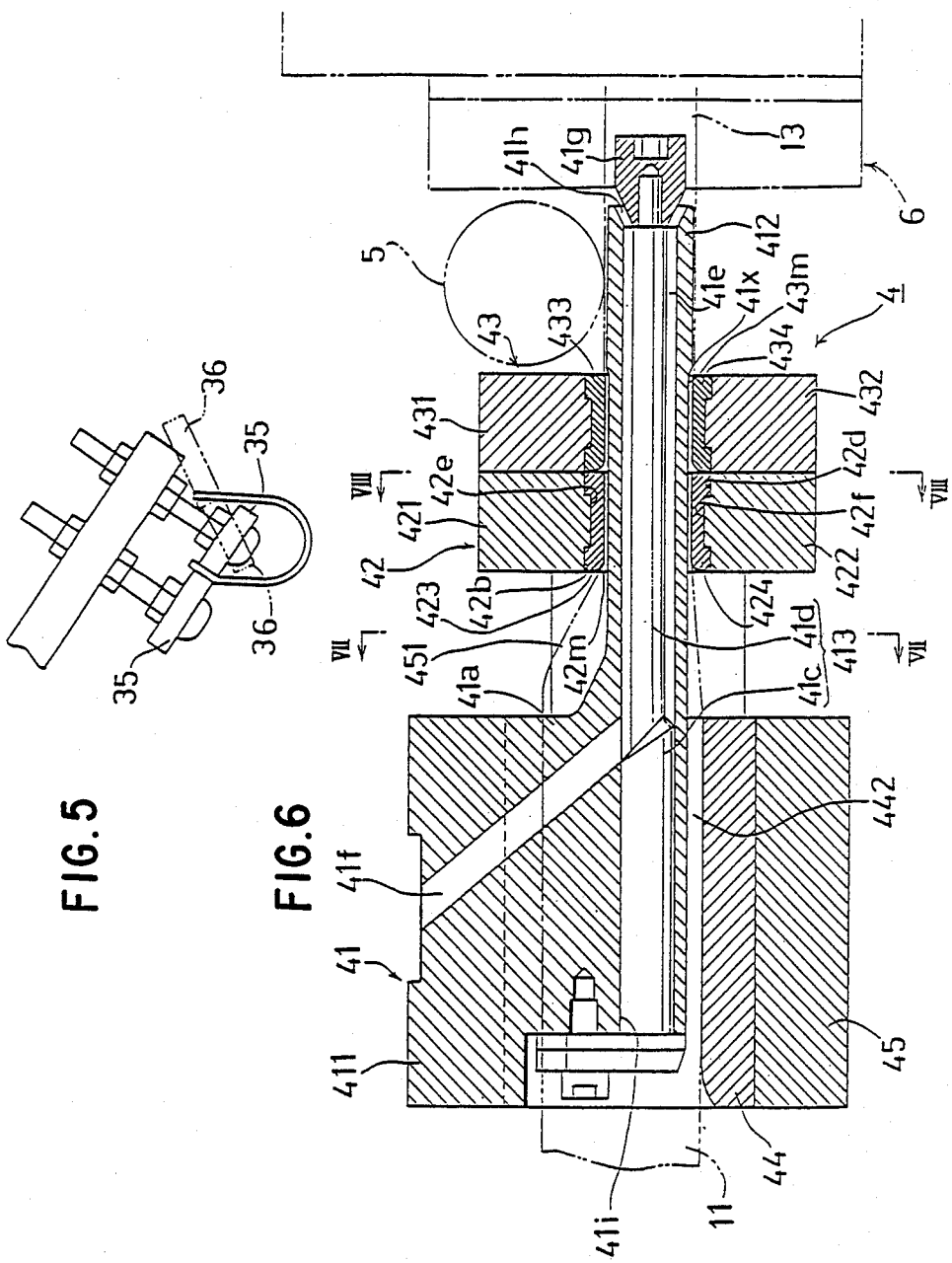

METHOD FOR THE PRODUCTION OF A COMPOSITE PIPE AND AN APPARATUS FOR THE SAME

BACKGROUND OF THE INVENTION

1. Field of the Invention

This invention relates to a method for the production of a composite pipe made of metal with its inner surface covered with a plastic layer, and to an apparatus for producing the same.

2. Description of the Prior Art

An apparatus for the production of metal pipes with their inner surfaces covered with a plastic layer has been disclosed in, for example, French Patent 2463673. This apparatus has a U-shape-forming die and a cylinder-forming die. The U-shape-forming die bends coiled metal sheets while they are conveyed in the longitudinal direction so that the edges on either side of the sheet come to face each other in a U-shaped cross-section. The cylinder-forming die forms a perfect cylinder from this metal sheet with its U-shaped cross-section and also forms a plastic layer on the inside surface of the metal sheet that has been formed into a cylinder by forcing out molten resin. This cylinder-forming die has an inner mold and an outer mold that fit together so that a cylindrical space (mold cavity) is formed. By passage of the metal sheet, which has been bent into a U-shape, through this space, the edges in the short direction across the sheet having a U-shaped cross-section overlap each other to form a cylinder. In addition, molten resin is made to flow through the inner mold, and extruded from the tip of the inner mold in the downstream side of the direction of conveyance of the metal sheet to the inner surface of the metal sheet that has been formed into a cylinder so as to cover the inner surface of the metal sheet with a plastic layer.

In order that the cylinder-forming die forms the metal sheet with a U-shaped cross-section and with its edges overlapping each other into a perfect cylinder without creation of an incompletely circular cross-section, it is preferable to extend the distance in which the U-shape of the metal sheet is formed into a cylinder by extending the interval in which the cylindrical space is formed between the inner mold and the outer mold. However, it is not possible to make the distance of the inner mold long. That is, because molten resin flows through the inside of the inner mold and is extruded from the top thereof in the downstream side to the cylinder, then if the flow path of the molten resin in the inner mold is extended, it is necessary to increase the pressure exerted on the molten resin, or it will not be possible for the molten resin to be extruded from the said tip. In particular, if the diameter of the composite pipe to be formed is small (30 mm or less), the flow path of the molten resin is greatly narrowed, and it is necessary to increase extremely the pressure applied to the molten resin.

It is necessary to place the tip on the downstream side of the inner mold, inside of which the molten resin flows, inside the metal sheet that is formed into a cylinder while the metal sheet is being conveyed, so the tip section cannot be supported. Thus, the inner mold is held on one end. If the inner mold that is held on one end is made long, there is a danger that its tip will bend. The inner mold will no longer be concentric with the outer mold that forms the metal sheet into a cylinder, so that the metal sheet cannot be formed into a complete cylinder. Moreover, when the edges of the metal sheet overlap each other to be joined by a welding method, pressure is applied to the overlapping edges, resulting in the application of pressure to the inner mold, which causes the bending of the inner mold. If the inner mold bends, the molten resin that is extruded from the tip of the inner mold will not be able to cover the inside surface of the metal sheet in the shape of a cylinder with a layer of uniform thickness. The joint in the metal sheet formed into a cylinder is ordinarily welded by an ultrasonic welding method. With this ultrasonic welding method, there is a danger that the inner mold that is being held at one end will resonate with the metal sheet that is in the shape of a cylinder. If the inner mold gives rise to resonance in the metal sheet that is in the shape of a cylinder, the joint of the metal sheet may not be welded. When a composite pipe the metal sheet of which has joints that are not satisfactorily welded is used, the inner part may not be able to resist the pressure of the fluid flowing therein and may be damaged.

The metal sheet will be formed into a cylinder while touching both the inner mold and the outer mold, and accordingly when it is made of a material softer than the materials of the inner and outer molds, there is the danger that it be damaged. If the inner surface of the metal sheet formed into a cylinder is damaged, then when it is used as a composite pipe with a high-pressure fluid flowing through the inner section, the pipe may be unable to resist the high pressure of the fluid, and may be damaged. If the area of contact of the metal sheet with the inner mold and the outer mold is a liner of synthetic resin softer than the metal sheet, damage to the metal sheet can be prevented. However, abrasion or damage can arise from the contact of the metal sheet with the liner. An abraded or damaged liner must be replaced, but in order to replace it, it is necessary to stop the conveyance of the metal sheet. Also, after replacement has occurred, it is necessary to adjust the fit of the inner mold and the outer mold so that the molds are once more concentric, and this adjustment process takes much time, which markedly lowers productivity.

When the cylinder-forming die brings together the side edges in the short direction across the metal sheet that has been bent so as to have a U-shaped cross-section, there is the possibility that the edges will push at each other and cause damage to each other, resulting in metal refuse or pieces. There is also the danger that when the overlapping is being done, the side edge of the metal sheet to be placed on the inside will be touched by the side edge that is placed on the outside, damaging the said inner surface resulting in metal refuse or pieces. Damage that arises in this way lowers the strength of the metal pipe so that when a high-pressure fluid passes through the inside, the pipe may be damaged. In order to make the pipe have a fixed inner diameter, the inner mold of the cylinder-forming die is designed so that the section in the downstream direction is made to have a larger diameter than the section upstream, and so that the larger-diameter section of the inner mold defines the inner diameter of the resulting pipe. With such a structure of the inner mold, the metal refuse or pieces created by the sliding of one edge on the other of the U-shaped metal sheet are accumulated in the step at the boundary between the large-diameter section and the small-diameter section of the inner mold. There is the chance that the accumulated metal refuse or pieces may cause new damage to the inside surface of the pipe. Also, the length in the circumferential direction of the sides overlapping with each other is short, so that if these side sections cannot be accurately bent, the side edges will not touch each other properly. In particular, one side edge on the outside bears the other side edge on the inside by touching of the interior surface of the outer side edge, so it is possible that a spring action will cause the inner-side edge to spring the outer-side edge upward. This springing upward of the outer-side edge causes damage to the outer mold of the cylinder-forming die and accelerates abrasion of the said mold. If strong friction between the side edge of the metal sheet and the outer mold is generated, it may become difficult to convey the metal sheet by pulling. If friction becomes still greater, the metal sheet conveyed will be broken. At the time of overlapping, there is the danger that the overlapping of the edge on the outside and the edge on the inside may be reversed; in this case, it is not possible to carry out the succeeding process of welding with accuracy. There is also the chance that the edge of the inner side will fold back the edge of the outer side, and in these circumstances, the composite pipe obtained will not have the strength to resist the flow of a high-pressure liquid.

SUMMARY OF THE INVENTION

The method for the production of a composite pipe of this invention, which overcomes the above-discussed and numerous other disadvantages and deficiencies of the prior art, comprises forming a coiled metal sheet into a cylinder, during the conveyance of the metal sheet, by a cylindrical inner mold and at least one of a plurality of outer molds lined up in the direction of conveyance of the metal sheet, said outer mold having a housing composed of two separatable parts and being fitted around said inner mold with a fixed space; joining the side edges in the circumferential direction of said cylinder together; and extruding molten resin into a cylindrical shape over the inner surface of the cylinder from the inner mold, resulting in a composite pipe the inner surface of which is covered with a plastic layer.

In a preferred embodiment, the inner surface of each of the parts of said housing is provided with a half-cylindrical liner, which can be attached thereto and detached therefrom, in such a manner that said liner fits over said inner mold with a fixed space.

In a preferred embodiment, the liner is made of fluororesin or aromatic polyester resin.

In a preferred embodiment, the side edges in the circumferential direction of the cylinder are joined together by supersonic welding or high-pulse arc welding.

In a preferred embodiment, the metal sheet is made of aluminum alloy, and said plastic layer is made of a polyolefin compound in which polyolefin is cross-linked by silane compounds by both hydrolysis and a radical reaction.

In a preferred embodiment, the metal sheet is pre-surface-treated.

In a preferred embodiment, the surface-treatment comprises a step of alkaline treatment and a step of heat-treatment following said alkaline treatment.

In a preferred embodiment, the alkaline treatment is carried out with sodium hydroxide and/or potassium hydroxide in a concentration of 5-15% for 30-60 seconds at a temperature of 30°-50° C.

In a preferred embodiment, a neutralization step and/or a washing step with water takes place before said heat treatment.

In a preferred embodiment, the metal sheet is bent, resulting in a U-shaped cross-section thereof, before it is formed into a cylinder.

In a preferred embodiment, the metal sheet is bent in such a manner that the side edges in the short direction across the metal sheet face each other and approach to each other, resulting in a U-shaped cross-section thereof.

An apparatus for the production of a composite pipe of this invention comprises a cylindrical inner mold within which molten resin flows and from the tip of which the molten resin is extruded; a plurality of outer molds lined up in the direction of conveyance of a coiled metal sheet, each of said outer molds having a housing composed of two separatable parts and concentrically being fitted around said inner mold with a fixed space, whereby a coiled metal sheet is formed into a cylinder while the metal sheet is conveyed through said space between the inner and the outer molds; and a joining means for joining the side edges in the circumferential direction of said cylinder together.

In a preferred embodiment, the inner surface of each of the parts of said housing is provided with a half-cylindrical liner, which can be attached thereto and detached therefrom, in such a manner that said liner fits over said inner mold with a fixed space.

In a preferred embodiment, the liner is made of fluororesin or aromatic polyester resin.

In a preferred embodiment, the side edges in the circumferential direction of the cylinder are joined together by supersonic welding or high-pulse arc welding.

Thus, the invention described herein makes possible the objects of (1) providing a method for the production of a composite pipe in which a metal sheet is formed accurately into a cylinder with a fixed diameter and a perfectly cylindrical cross-section from a metal sheet; (2) providing a method for the production of a composite pipe in which while a metal sheet is being formed from a metal sheet into a cylinder, damage does not occur in the metal sheet; (3) providing a method for the production of a composite pipe in which interruption of the formation process of a cylinder is not required even when the outer mold that folds the metal sheet is to be replaced; (4) providing a method for the production of a composite pipe in which damage by the edges to either side of the metal sheet overlapped with each other is prevented when the metal sheet that has been formed so as to have a U-shaped cross-section is formed into a cylinder; (5) providing a method for the production of a composite pipe in which a cylindrical shape is obtained by the accurate overlapping of the edges to either side of the metal sheet with each other; (6) providing a method for the production of a composite pipe in which the accurate attachment of a plastic layer to a metal sheet can be attained; and (7) providing an apparatus for the production of the above-mentioned composite pipe.

BRIEF DESCRIPTION OF THE DRAWINGS

This invention may be better understood and its numerous objects and advantages will become apparent to those skilled in the art by reference to the accompanying drawings as follows:

FIG. 3 is a front view of the machine shown in FIG. 2.

FIG. 4 is a cross-sectional view along the IV—IV line of FIG. 3.

FIG. 5 is a front view showing another bending means in the U-shape-forming die of this invention.

FIG. 6 is a sectional view showing a cylinder-forming die.

DESCRIPTION OF THE PREFERRED EMBODIMENTS

Figure 1:
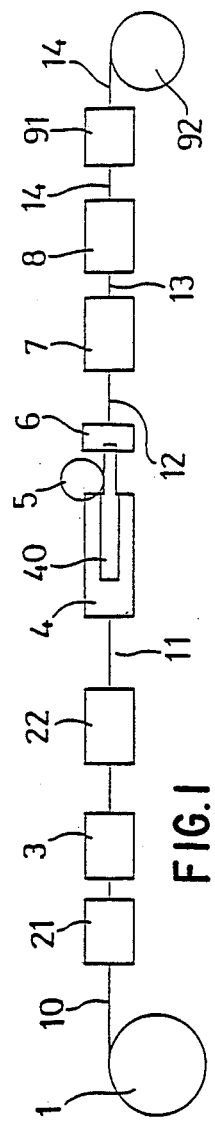
FIG. 1 is a block diagram of a method for the production of a composite pipe of this invention.

The method for the production of a composite pipe of this invention is carried out with the use of an apparatus such as that shown in FIG. 1. The apparatus makes, for example, a composite pipe the inside surface and outside surface of which is covered with a plastic layer.

The apparatus for the production of the composite pipe pulls out a coiled metal sheet (made, for example, of annealed aluminium alloy) 10 from an uncoiler 1, threats the surface of the metal sheet by the surface-treatment device 21, and then bends the said metal sheet so that its cross-section is in a U-shape with the edges on either side facing each other by a U-shape-forming die 3. Then, the metal sheet 11 that has been bent into a U-shape is heat-treated with a heating device 22, and formed into a pipe 12 that has a perfectly round cross-section by a cylinder-forming die 4. The side edges of the pipe 12 made by the cylindrical-forming die 4 are joined to each other by a joining device such as a welding machine 5, and a molten plastic (e.g., a polyolefin compound in which polyolefin is cross-linked by silane compounds by both hydrolysis and a radical reaction) is extruded over the interior surface of the pipe 12 by an inner-surface resin-covering device 40, which is disposed from the inside of the U-shaped metal sheet 11 to the inside of the pipe 12, to cover thereby the interior surface of the pipe 12 with a plastic layer. An adjustment device 6 is disposed in the downstream of the joining device 5 that makes uniform the thickness of the plastic layer covering the inner surface of the pipe 12 by the inner-surface resin-covering device 40. To the downstream side of the adjustment device 6, there is provided, for example, an outer-surface resin-covering device 7 that makes a plastic layer to cover the outside surface of the pipe 12. Moreover, on this downstream side, there is a cooling device 8 that is for the cooling of the pipe 13 that has had its inner surface and its outer surface covered with a plastic layer, a pulling device 91 that pulls out the cooled pipe (the composite pipe) 14, and a coiler 92 that winds up the composite pipe 14, in that order. The pulling device 91 pulls the metal sheet 10 from the uncoiler 1, and conveys the composite pipe onward through all of the steps of its formation.

In the surface treatment process 21, the surface treatment of, for example, an annealed aluminium alloy is as follows when the said aluminium alloy is covered with a plastic layer made of the above-mentioned polyolefin compound: First, the said aluminum alloy is treated with alkali so as to increase the chemical binding strength between the said polyolefin compound and the aluminum alloy, and then the alkali-treated aluminium alloy is heat-treated. The alkaline treatment process involves, for example, treatment with 5–15% sodium hydroxide and/or potassium hydroxide for 30–60 seconds at 30°–50° C. It is possible to attain the desired degree of adhesion even if the concentration, temperature, and treatment time are outside these ranges mentioned above for concentration, temperature, and treatment time, provided that the concentration, temperature, and treatment time are varied relative to each other. Under the conditions mentioned above, the temperature can be maintained at 30°–50° C. without heat treatment because of the heat of reaction during the alkaline treatment of the aluminium alloy. For that reason, alkaline treatment under these conditions is preferred. High concentrations, high temperatures, and long periods of treatment are helpful in the removal of magnesium oxide from the surface of the aluminium alloy, but at the same time, they cause the formation of aluminium hydroxide, and the aluminium hydroxide acts as a peeling agent, which reduces adhesion and resistance. Treatment for long periods is not appropriate for the manufacture of composite pipes, which are made continuously. After this kind of alkaline treatment, the alkaline treatment reaction is stopped by a neutralization step and/or a step of washing with water, as needed. In the neutralization step, the aluminium alloy that has received the alkaline treatment is washed in water, and then acid such as nitric acid, hydrochloric acid, sulfuric acid, etc., and preferably nitric acid, is added. Washing with water is done so as to prevent deterioration of the neutralization liquid. The nitric acid is added at a 10% concentration in the amount needed for neutralization at 30° C. It is also possible to use a washing step instead of the neutralization step.

Figure 2:
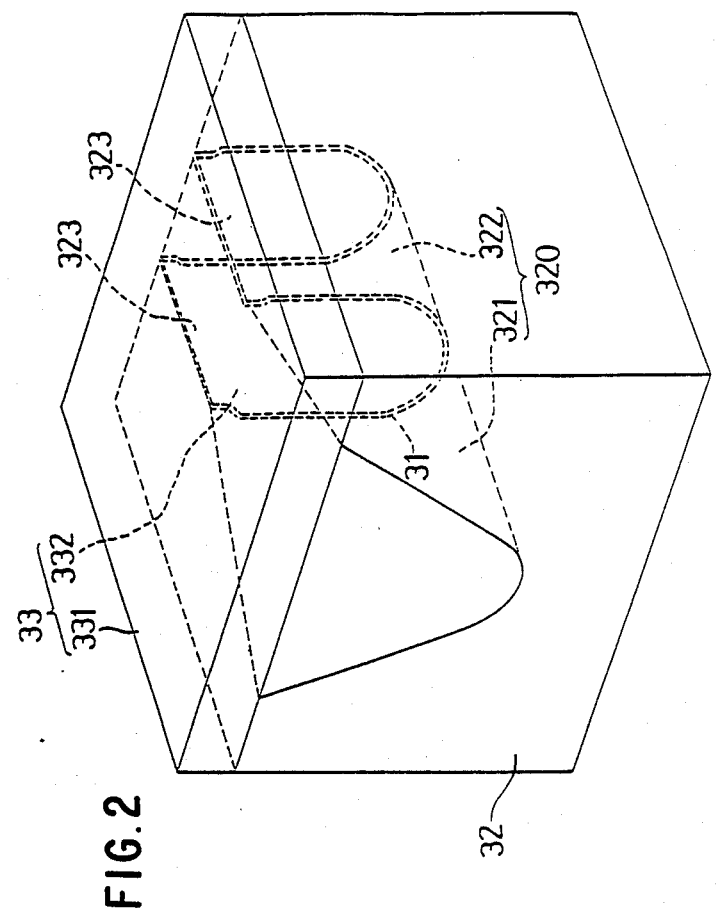
FIG. 2 is a perspective view showing a U-shape-forming die.

The metal sheet 10 that has had such surface treatment is then introduced into the die 3 that forms U shapes. The U-shape-forming die 3 has, as shown in FIGS. 2 to 4, an outer mold 32 and an inner mold 33. The outer mold 32 has an indented area 320. The said indented area 320 is formed in the direction of conveyance of the metal sheet 10. The cross-section below the indented area 320 is a half-cylinder in shape throughout the entire region of the conveyance. The upstream region 321 of the indented area 320 has two sides that are opened upward so as to have a cross-section that is V-shaped, and the downstream region 322 has sides that are parallel with each other so as to have a cross-section that is U-shaped. The upper edges of the upstream region 321 approach each other gradually from the upstream side to the downstream side, so that the upstream region 321 can be smoothly connected to the downstream region 322 with a U-shaped cross-section. The edges of the downstream region 322 that face each other with their side surfaces have upper edge sections 323 that approach each other so as to slant slightly toward the center.

The inner mold 33 has a flat attachment section 331 fixed on the upper surface of the outer mold 32, and a body section 332 that fits at a fixed gap 31 from the downstream region 322 of the outer mold 32. The attachment section 331 is positioned above the whole region of the indented area 320 on the outer mold 32. The body section 332 is designed in the same manner as the downstream section of the indented area 320 of the outer mold 32; that is, the upper edge sections of both surfaces that face each other approach so as to slant toward the center so that the cross-section can be a U shape. The said body section 332 is at a fixed distance from the downstream region 322 of the indented section 320 of the outer mold 32, so that body section 332 of the inner mold 33 and the indented area 320 of the outer mold 32 have their upper edge sections slanting toward the center to form a U-shaped gap 31.

The metal sheet 10, which has had surface treatment, is bent into a curve by along its central axis by the roller 30 provided in the upstream side of the said die 3 for forming U shapes. Then, the curved metal sheet 10 is introduced into the said die 3 for forming U shapes. The coiled metal sheet 10 is then guided to the upstream region 321 of the indented section 320 of the outer mold 32, introduced into the gap 31, and bent into a U shape by the bending of its edges so that they come to approach each other.

When the die for forming U shapes bends the coiled metal sheet so that its cross-section is in the shape of a U in this way, it needs a bending means by which the metal sheet is formed into a U-shape so that the opening edges of the U-shaped metal sheet that face each other come to approach each other. However, the said bending means is not limited to the space 31 formed between the inner mold 33 and the outer mold 32. Such a bending step can be carried out by use of the bending means shown in FIG. 5; for example, after the metal sheet is formed into a curve by the inner mold 33 and the outer mold 32 so that the edges that face each other are parallel and the cross-section of the sheet is a U-shape, then the rollers 35 that are opposed to each other as shown in FIG. 5 bend one opening edge of the U-shaped metal sheet in such a way that the opening edge slants gradually toward the center; and the rollers 36 disposed in the downstream of the rollers 35, likewise, bend the other opening edge of the U-shaped metal sheet in such a way that the other opening edge slants gradually outward the center. In general, the rollers 35 and 36 are disposed in the upstream of the U-shape-forming die and work to bend the U-shaped metal sheet, as mentioned above, together with the U-shape-forming die.

The distance of bending of the opening edges of the U-shaped metal sheet is set so as to correspond to the overlap width at the time when the U-shaped metal sheet is formed into a cylinder. The degree of each curve of the opening edges is set such that the curvature of one edge placed on the inside when overlapped with the other edge corresponds to that of a cylinder to be formed and such that the curvature of the other edge is set to be slightly greater than that of the cylinder. If the degree of the curves is large, the cylinder to be formed will not be a perfect cylinder, and damage may be done to the inner mold at the time of the making of the cylinder.

Next, in order to improve the wetting properties of the surface, heat treatment is done. The heat treatment is done at a temperature above the temperature of fusion of the above-mentioned polyolefin compound and below the upper limit of the molding temperature. If the temperature is less than the temperature of fusion, sufficient improvement of the wetting properties of the surface of the aluminium alloy will not be achieved. If the temperature is above the molding temperature, not only will the strength of the aluminium alloy decrease, but also the magnesium in the inside of the aluminium alloy will be oxidized and the resulting magnesium oxide will crystallize on the surface, which will decrease the strength of adhesion. The temperature of heat treatment is, for example, in the range of 125°–250° C.

By the above-mentioned alkaline treatment, magnesium oxide is removed from the surface of the annealed aluminium alloy. For that reason, there is only aluminium oxide remaining in the surface of the annealed aluminium alloy. The aluminium oxide and the above-mentioned polyolefin compound bind to each other mainly by polar bonds, and with the heat treatment of the aluminium alloy improving the wetting properties of the surface, strong adhesion is achieved.

Figure 7:
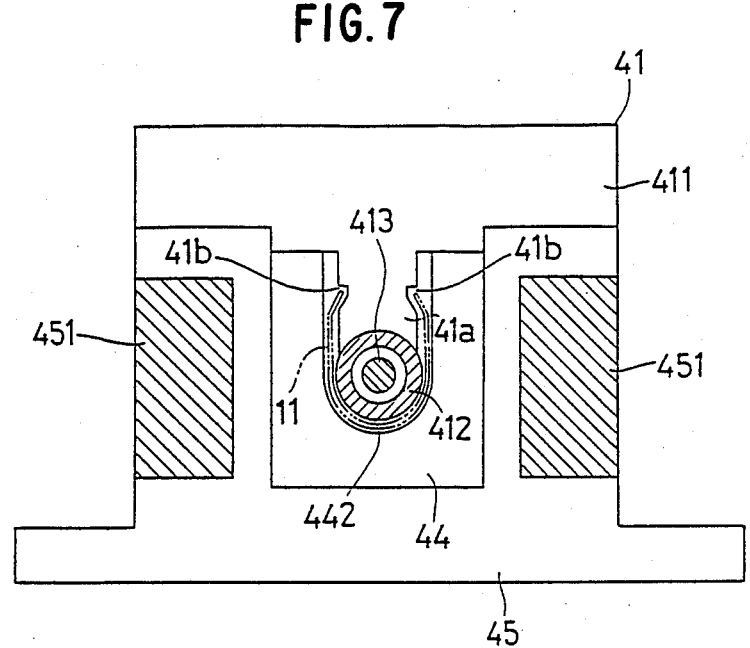
FIG. 7 is a cross-sectional view along the VII—VII line of FIG. 6.
Figure 8:
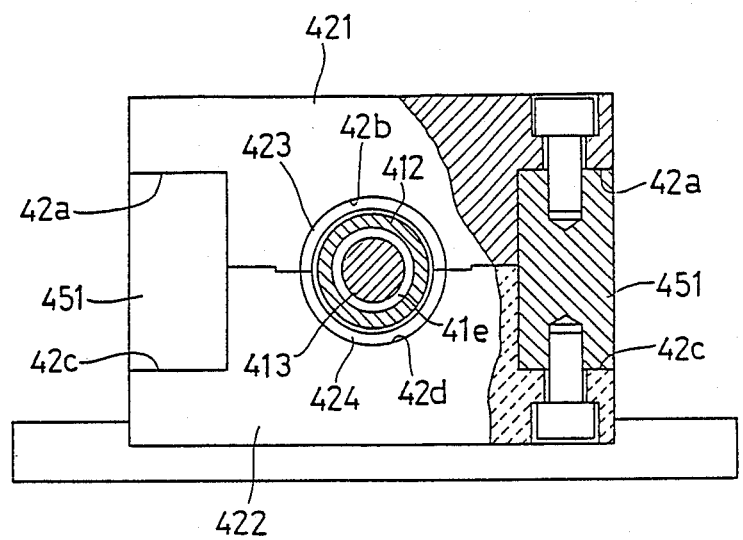
FIG. 8 is a cross-sectional view along the VIII—VIII line of FIG. 6.

The heat-treated metal sheet is introduced into the die 4 for forming cylinders. The cylinder-forming die 4 of this invention has, as shown in FIGS. 6 to 8, an inner mold 41 and two connected outer molds 42 and 43. The inner mold 41 has a supporter 411 placed on the upstream in conveyance of the U-shaped metal sheet 11, a cylindrical molding section 412 that extends from the said supporter 411 downstream, and a core 413 fitting inside the molding section 412. Beneath the supporter 411, there is a connector 41a with a U-shaped cross-section that fits into the inside of the U-shaped metal sheet 11. In the upper portion of the connector 41a, there are indentations 41b formed so as not to touch the upper edges of the U-shaped metal sheet 11 that are slanting inward. The molding section 412 extends from the said connector 41a in the downstream direction. The said connector 41a has a hole 41i that passes through the inside of the molding section 412, and the core 413 passes through the said hole 41i and the inside of the molding section 412.

The said connector 41a fits into the U-shaped spacer 44 with a fixed space 442. This spacer 44 fits into the inside of the supporter 45. The U-shaped metal sheet 11 passes through the inside of the above-mentioned space 442.

The core 413 has a large-diameter section 41c that fits tightly into the hole 41i of the said connector 41a, and a small-diameter section 41d that passes through the inside of the cylindrical molding section 412. The said small-diameter section 41d is at a fixed gap 41e from the inside surface of the said molding section 412. The said gap 41e goes through the resin path 41f that is formed in the supporter 411. The tip of the small-diameter section 41d of the core 413 is provided with a core clasp 41g, which fits into the opening of the tip of the molding section 412, forming a nozzle 41h. Molten resin is pushed through the resin path 41f of the supporter 411. The molten resin under pressure is extruded in the circumferential direction from the nozzle 41h after passing through the gap 41e between the molding section 412 and the core 413. This molding section 412 and the core 413 together with the core clasp 41g constitute the resin-layering apparatus for inside surfaces 40.

There are four adjustment bolts (not shown) provided at the tip of the molding section 412. The four bolts are disposed on the outer surface of the said molding section 412 so that its circumference is divided into four parts. Each adjustment bolt is screwed in from the outside surface, and the head of each adjustment bolt is sunken so as not to project above the outer surface of the molding section 412. The tip of each adjustment bolt touches the outer surface of the tip section of the core 413. Thus, by the procedure of rotating each adjustment bolt, the position of the core 413 can be changed with respect to the molding section 412, with the said core 413 being kept concentric with the molding section 412. Molten resin forced with pressure along the resin route 41f flows through the space 41e between the core 413 and the molding section 412. However, because the tip section of the core 413 is supported by the four adjustment bolts, there is no danger than the molten resin will push against the core 413 so as to make it no longer concentric with the molding section 412.

The supporter 45 that fits outside of the spacer 44 has a pair of arms 451 that extend out therefrom in the downstream direction. The crosssection of each arm 451 is a rectangle, and the arms are set so as to be parallel with the sides of the molding section 412. The tips of the arms 451 are positioned in the middle area of the molding section 412.

At the tips of the arms 451, two connected outer molds 42 and 43 are lined up in the direction of the conveyance of the metal sheet 11. The construction of both outer molds 42 and 43 is roughly the same. The outer mold 42 in the upstream has a housing, which can be divided into two half parts 421 and 422 in the upwards and downwards directions, and liners 423 and 424, which are engaged with these halves 421 and 422 of the housing, respectively. The half of the housing 421 in the upward direction has indentations 42a that match the arms 451 of the supporter 45. These indentations 42a are provided on the outside of the half of the housing 421. The half of the housing 421 has in the center of its bottom an indentation 42b that is formed along the direction of the conveyance of the metal sheet. The said indentation 42b has an inner surface in the shape of a semicircular cylinder and an opening facing the bottom. There is a boss 42e in the center of the said indentation 42b, and the indentation 42b is fitted with a semicircular cylinder-shaped liner 423, which also fits the boss 42e. The said liner 423 has a smooth inner surface in the shape of a semicircular cylinder, and fits the outer surface of the molding section 412 of the inner mold 41 at a fixed distance. The edges of the said liner 423 gradually draw apart in the upstream direction. As the material used for the said liner 423, synthetic resin such as fluororesin, aromatic polyester resin, etc., which have superior heat-resistance and resistance to friction and with which the metal sheet can move with low friction, can be used.

The half part of the housing 421 with the liner 423 fitted in the indentation 42b thereof is fixed on the upper sections of the arms 451 by screws in such a way that the arms 451 are engaged with the indentations 42a of the housing 421.

The construction of the bottom half of the housing 422 is the same as that of the upper half of the housing 421 except for being reversed from top to bottom. The said half of housing 422 has, in the same way as the upper half of housing 421, indentations 42c at each outside thereof, and an indentation 42d in its central section. The inside surface of the indentation 42d is in the shape of a semicircular cylinder, and has a boss 42f. The indentation 42d is fitted with a liner 424 in the shape of a semicircular cylinder. The said liner 424 is integrated with the liner 423 that is installed in the upper half of the housing 421, resulting in a cylindrical space. The said liner 424 is made of the same kind of materials as the upper liner 424. Also, the said liner 424 has edges that gradually draw apart in the upstream direction.

The bottom half of the housing 422 is fixed in the bottom as follows: First, with the liner 424 fitted into the indentation 42d, the lower parts of the arms 451 of the supporter 45 fit into the indentations 42c so that the said liner 424 is opened toward the top. Then, in the lower region of the upper half of the housing 421, the said upper half of the housing 422 is fixed by screws at the lower surface of the arms 451 in such a way that the liners 423 and 424 form a path in the shape of an integrated cylinder.

When both the housing halves 421 and 422 are fixed by arms 451, the liners 423 and 424 are fitted to the outside concentrically at a fixed space 42m from the outside surface of the molding section 412 of the inner mold 41.

The outer mold 43 that is placed in the downstream direction has housing halves 431 and 432 and liners 433 and 434, like those of the outer mold 42 placed in the upstream direction. The said outer mold 43 is constructed in the same way as the outer mold 42 in the upstream direction, so an explanation of its construction is omitted here.

The outer molds 42 and 43 are fixed to the arms 451 of the supporter 45 in such a way that both outer molds 42 and 43 come tightly in contact with each other. The liners 433 and 434 are fitted on the outside surface of the molding section 412 of the inner mold 41 with a fixed space 43m from the outside surface of the molding section 412.

The molding section 412 of the inner mold 41 that extends from the said outer mold 43 in the downstream direction is slightly widened, forming the step 41x at the portion thereof facing the downstream end of the outer mold 43.

The metal sheet 11 that has been formed into a U shape by the die 3 for forming U shapes and that has been heat-treated by the heating device 22 passes through the space 442 between the connector 41a of the inner mold 41 of the cylinder-forming die 4 and the spacer 44, and is introduced into the spaces 42m and 43m between the molding section 412 of the inner mold 41 and the outer molds 42 and 43. The U-shaped metal sheet is overlapped in the free space between the connector 41a of the inner mold 41 and the outer mold 42, and introduced into the space 42m in the outer mold 42. Then, the overlapping section of the metal sheet 11, while it is passing through the spaces 42m and 43m, has pressure applied thereto, resulting in a perfectly cylindrical cylinder 12, which is then ejected from the outer mold 43. It is preferable that the above-mentioned free space is established to be as short as possible so as to shorten the length of the molding section 412 of the inner mold 41. With the apparatus of this invention, the free space can be set to be about two times at the shortest of the length (pathway) of the outer diameter of the cylinder that must be formed. The cylinder 12 ejected from the outer mold 43 has its inner diameter regulated by the widened section that is defined by the step 41x of the molding section 412.

The liners 423, 424, 433, and 434 of the outer molds 42 and 43 can all be removed from the halves of the housing 421, 422, 431, and 432, so if the inner surface of any of the liners is abraded, the liner can be replaced with a new one. This replacement can be carried out by detachment of the half of the housing of either the outer mold 42 in the upstream direction or the outer mold 43 in the downstream direction from the arms 451, while the U-shaped metal sheet 11 is formed into a cylinder in the space 42m or 43m between the outer mold 42 or 43 and the molding section 412 of inner mold 41. After the liner of one of the outer molds is replaced and the halves of the housings are reinstalled on the arms 451, the liner of the other outer mold is replaced in the same way. Thus, the replacement of each liner is carried out while the metal sheet 11 is being formed into a cylinder by the molding section 412 of the inner mold 41 and one of the two outer molds 42 and 43. The result is that it is possible for the replacement of each liner to occur while the pipe 12 is being formed without interruption of the process.

Further downstream from the downstream outer mold 43, there is a joining device 5, by which the overlapping portions of the cylinder 12 formed by the cylinder-forming die 4 are joined. This joining device 5 can be of any kind; an ultrasonic welding device, high-pulse arc welding device, spot welding device, etc., can be used.

The welded cylinder 12, while passing through the tip of the molding section 412 of the inner mold 41, has pushed onto its inner surface molten resin from the nozzle 41h formed at the said tip, by which the said inside surface of the cylinder 12 is covered with a plastic layer.

Figure 9:
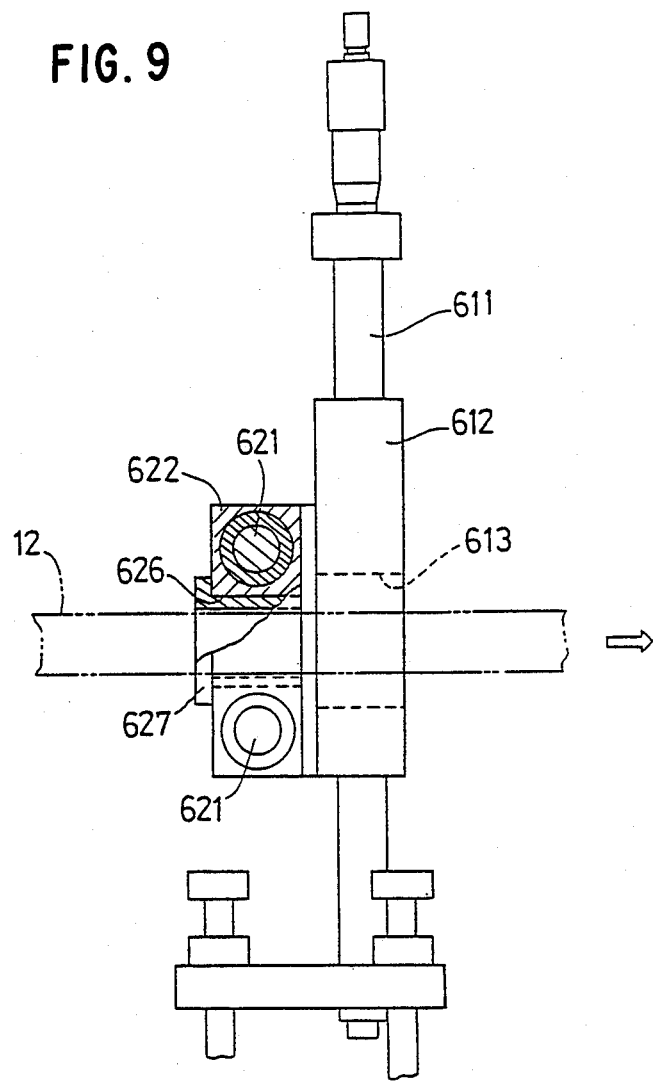
FIG. 9 is a side view showing an adjustment device for adjusting the position of the cylinder against the inner mold to thereby make uniform the thickness of the plastic layer covering the inner surface of the cylinder.
Figure 10:
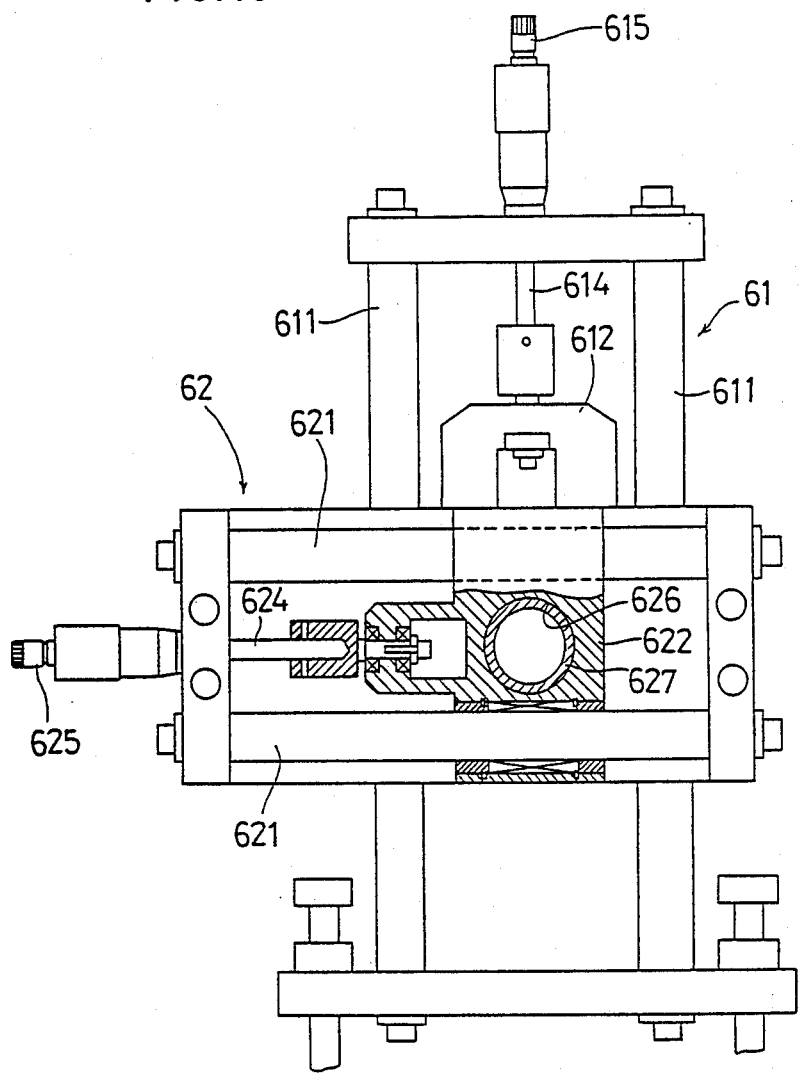
FIG. 10 is a front view with a partial section showing the adjustment device.

There is an adjustment device 6 at the tip of the core clasp 41g of inner mold 41. The said adjustment device 6 has, as shown in FIGS. 9 and 10, a perpendicular adjustment section 61 and a horizontal adjustment section 62. The perpendicular adjustment section 61 is placed in the downstream direction from the conveyance of the cylinder 12, and has a pair of guide poles 611 and a block 612. The guide poles 611 are installed perpendicular to the directions of conveyance of the cylinder 12. The guide poles 611 tunnel through both sides of the block 612, which can be moved in the perpendicular direction with the guidance of the two guide poles 611. The center of the said block 612 has a penetrating hole 613. This penetrating hole 613 is larger than the outer diameter of the pipe 12. The said block 612 is attached to the lower edges of an adjustment pole 614 that is installed perpendicularly. An adjustment section 615 fits over the upper edge of the adjustment pole 614. By the rotation of the said adjustment section 615, the adjustment pole 614 is screwed forward in the perpendicular direction, so that the block 612 can move upward or downward along the guide poles 611.

THe horizontal adjustment device 62 is attached to the surface of block 612 in the upstream direction. The said horizontal adjustment device 62 has a pair of guide poles 621 and a body section 622. The guide poles 621 are parallel with the upward and downward direction of the conveyance of the cylinder 12, respectively, and are attached so as to be part of the block 612 of the perpendicular adjustment device 61 mentioned above. The guide poles 621 each pass through the upper section and the lower section of the body section 622, so that the said body section 622 can be moved in a horizontal direction with the guidance of the guide poles 621. One end of the adjustment pole 624 that is installed horizontally is attached to the body section 622. An adjustment section 625 fits around the other end of the said adjustment pole 624. By the regulation of the said adjustment section 625, the adjustment pole 624 is screwed forward in the horizontal direction so that the body section 622 can be moved in the horizontal direction along guide poles 621. The center of the body section 622 has a penetrating hole 626 that fits over the outside of the top section of the molding section 412 of the inner mold 41. The said penetrating hole 626 has its surface covered with liner 627. A flange section is disposed at the upstream edge of the liner 627. The said liner 627 can be made of a synthetic resin such as fluororesin, aromatic polyester resin, etc., which has excellent resistance to abrasion and to heat, and which can result in the lowering of friction with the metal cylinder 12. The adjustment device 6 is not limited to the abovementioned construction, but can also be constructed with a liner 627 to be moved in the horizontal and the perpendicular directions by the four screw bolts disposed around the said liner 627.

Instead of the above-mentioned liner, a number of drum shaped rollers can be rotatably disposed in the penetrating hole 626 in a manner to form a cylindrical space in the central area. In this case, abrasion of the surfaces of the rollers can be prevented because the roller touch the cylinder 12 and rotate, and accordingly the difficulties of replacement of the liner can be overcome.

The said adjustment device 6 guides the cylinder 12, which has been formed into a cylindrical shape by the cylinder-forming die 4 and which has had its inner surface coated with plastics, through the penetrating hole 626 of the horizontal adjustment device 62 and the penetrating hole 613 of the perpendicular adjustment device 61 to the outer-surface covering metal mold 7. Then, the said adjustment device 6 has the cylinder 12 move in the perpendicular and the horizontal directions so as to adjust the relative position of the said cylinder 12 with regard to that of the molding section 412 of the inner mold 41, thereby making uniform the thickness of the plastic layer that covers the inner surface of the cylinder 12.

It is preferable that the adjustment device 6 is disposed in a manner to fit around the tip of the core clasp 41g because the thickness of the plastic layer that covers the inner surface of the cylinder 12 can be adjusted by the fine adjustment of the device 6, but it is also preferred that it be installed to the downstream side of this position.

The cylinder 12 that is ejected from the adjustment device 6 becomes a cylinder 13, which is covered with plastics on its outer surface by an outer-surface covering metal mold 7. The said cylinder 13 is cooled in a cooling tank 8, resulting a composite pipe 14. The said composite pipe 14 is pulled out by the puller 91. The said puller 91 pulls the metal sheet 10 from the uncoiler 1 and conveys it until it becomes a composite pipe 14. The said composite pipe 14 is collected by a reel device 92.

It is understood that various other modifications will be apparent to and can be readily made by those skilled in the art without departing from the scope and spirit of this invention. Accordingly, it is not intended that the scope of the claims appended hereto be limited to the descrioption as set forth herein, but rather that the claims be construed as encompassing all the features of patentable novelty that reside in the present invention, including all features that would be treated as equivalents thereof by those skilled in the art to which this invention pertains.

What is claimed is:

1. A method for the production of a composite pipe with at least the inner surface thereof covered with a plastic layer, comprising the steps of:

forming a coiled metal sheet into a cylinder, during the conveyance of the metal sheet, by a cylindrical inner mold and at least one of a plurality of outer molds lined up in the direction of conveyance of the metal sheet, said outer mold having a housing composed of two separable parts and being fitted around said inner mold with a fixed space wherein the inner surface of each of the parts of said housing is provided with a half-cylindrical liner which can be attached thereto and detached therefrom, in such a manner that said liner fits over said inner mold with a fixed space;

joining the side edges in the circumferential direction of said cylinder together; and extruding molten resin into a cylindrical shape over the inner surface of the cylinder from the inner mold, resulting in a composite pipe the inner surface of which is covered with a plastic layer.

2. A method according to claim 1, wherein said metal sheet is bent, resulting in a U-shaped cross-section thereof, before it is formed into a cylinder.

3. A method according to claim 2, wherein said metal sheet is bent in such a manner that the side edges in the short direction across the metal sheet face each other and approach to each other, resulting in a Ushaped cross-section thereof.

4. A method according to claim 1, wherein said side edges in the circumferential direction of the cylinder are joined together by supersonic welding.

5. A method according to claim 1, wherein said side edges in the circumferential direction of the cylinder are joined together by high-pulse arc welding.

6. A method according to claim 1, wherein said metal sheet is made of aluminum alloy, and said plastic layer is made of a polyolefin compound in which polyolefin is cross-linked by silane compounds by both hydrolysis and a radical reaction.

7. A method according to claim 6, wherein said metal sheet is is subjected to a surface-treatment before it is formed into a cylinder.

8. A method according to claim 7, wherein said surfacetreatment comprises a step of alkaline treatment and a step of heat-treatment following said alkaline treatment.

9. A method according to claim 8, wherein said alkaline treatment is carried out with sodium hydroxide and/or potassium hydroxide in a concentration of 5–15% for 30–60 seconds at a temperature of 30°–50° C.

10. A method according to claim 8, wherein a neutralization step and/or a washing step with water takes place before said heat treatment.

11. A method according to claim 1, wherein said liner is made of fluororesin or aromatic polyester resin.

12. An apparatus for the production of a composite pipe with at least the inner surface thereof covered with a plastic layer, comprising a cylindrical inner mold within which molten resin flows and from the tip of which the molten resin is extruded;

a plurality of outer molds lined up in the direction of conveyance of a coiled metal sheet, each of said outer molds having a housing composed of two separable parts and being concentrically fitted around said inner mold with a fixed space, wherein the inner surface of each of the parts of said housing is provided with a half-cylindrical liner which can be attached thereto and detached therefrom, in such a manner that said liner fits over said inner mold with a fixed space, whereby a coiled metal sheet is formed into a cylinder while the metal sheet is conveyed through said space between the inner and the outer molds; and a joining means for joining the side edges in the circumferential direction of said cylinder together.

13. An apparatus according to claim 12, wherein said side edges in the circumferential direction of the cylinder are joined together by high-pulse arc welding.

14. An apparatus according to claim 12, wherein said side edges in the circumferential direction of the cylinder are joined together by supersonic welding.

15. An apparatus according to claim 12, wherein said liner is made of fluororesin or aromatic polyester resin.

* * * * *